Sept. 8, 1959   A. S. WHEELBARGER   2,902,872
VARIABLE GEAR REDUCTION UNIT
Filed June 26, 1956   3 Sheets-Sheet 1
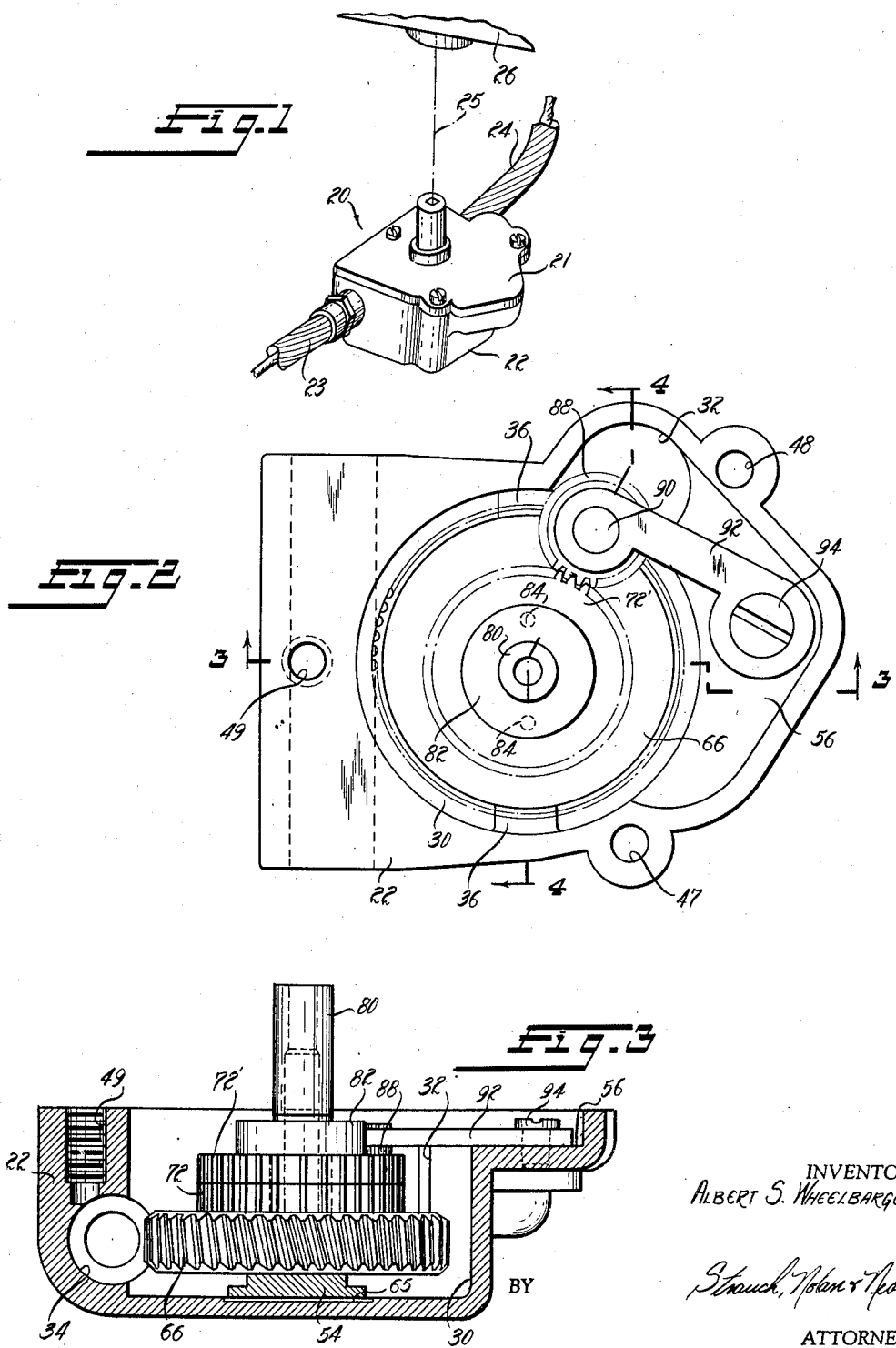
INVENTOR
ALBERT S. WHEELBARGER
BY Strauch, Nolan & Neale
ATTORNEYS

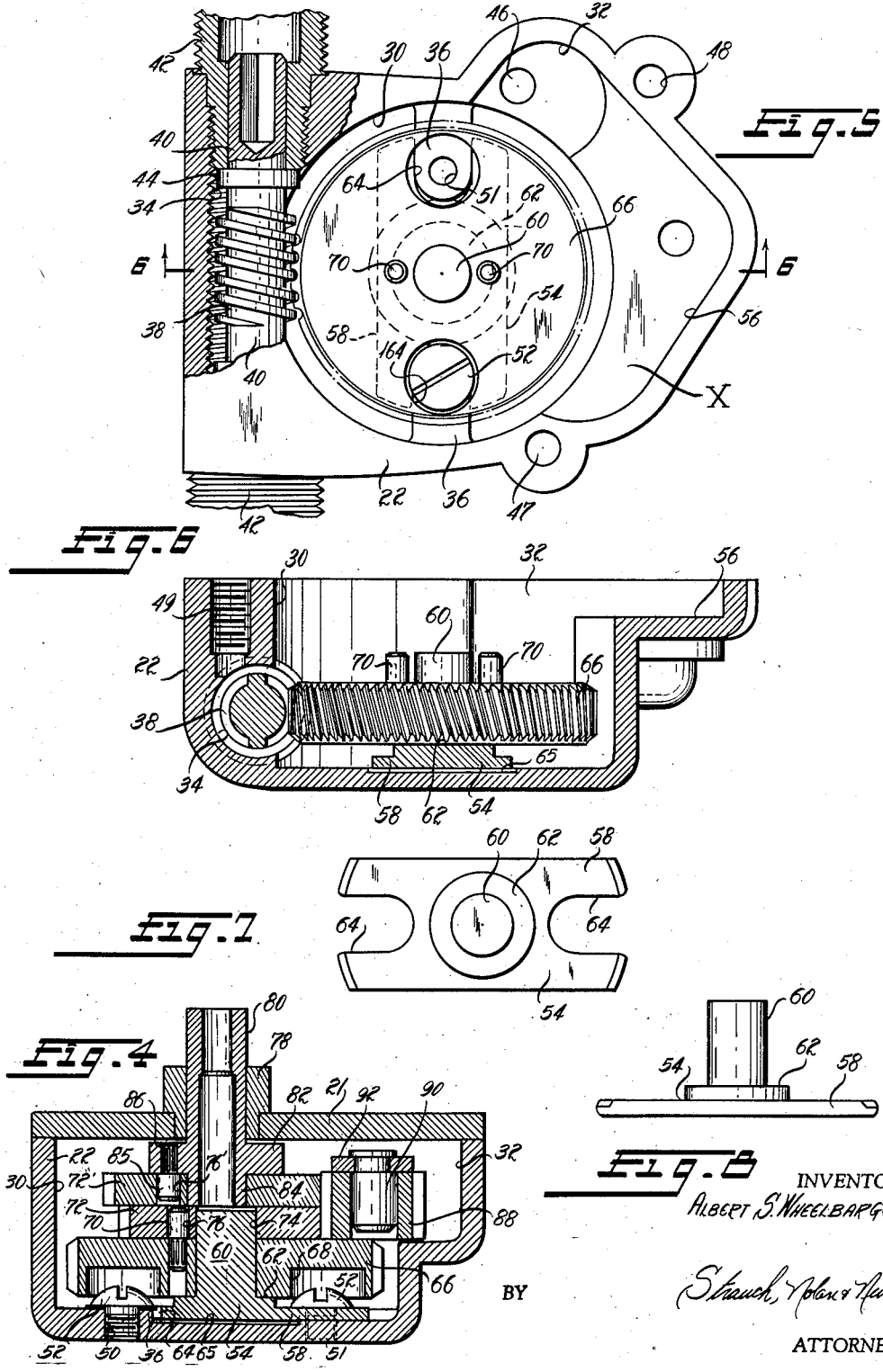

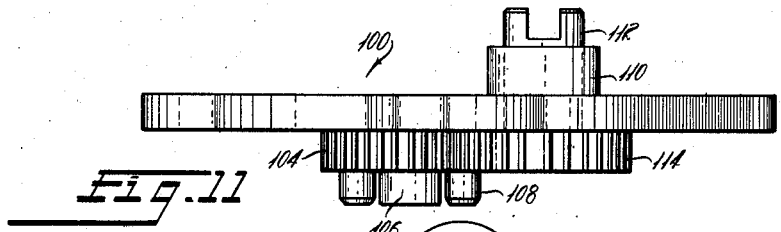
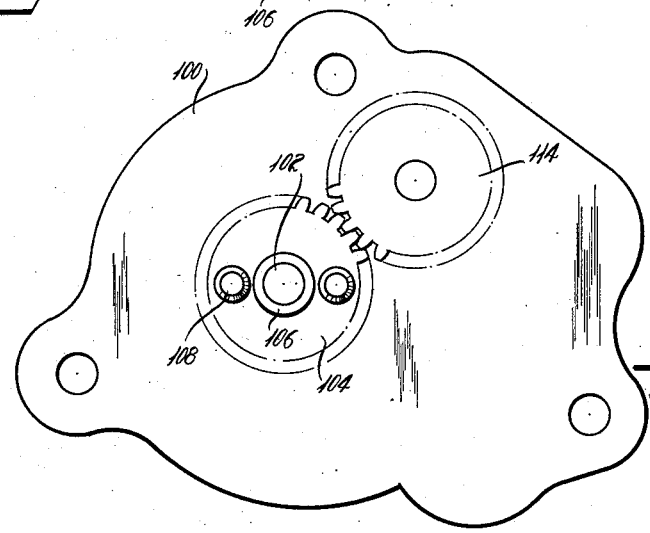
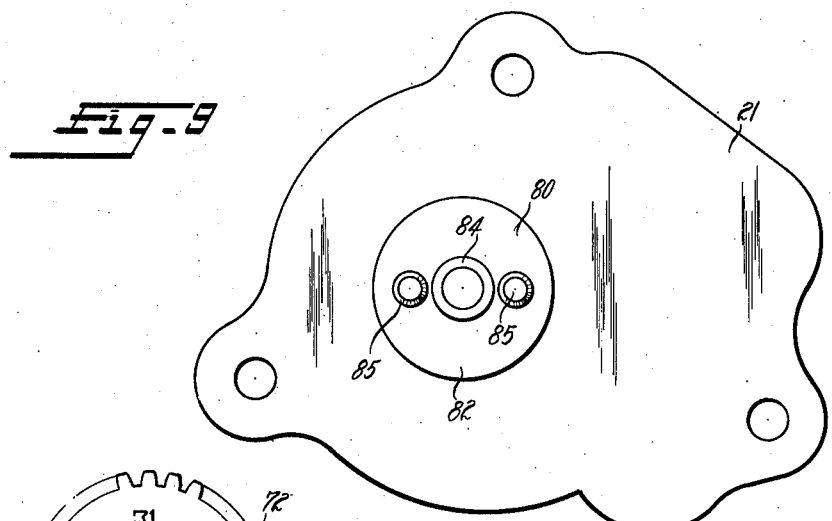
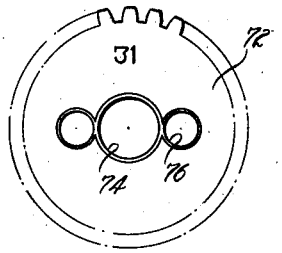

United States Patent Office 2,902,872
Patented Sept. 8, 1959

2,902,872

VARIABLE GEAR REDUCTION UNIT

Albert S. Wheelbarger, Pittsburgh, Pa., assignor to Rockwell Manufacturing Company, Pittsburgh, Pa., a corporation of Pennsylvania Application June 26, 1956, Serial No. 593,868

16 Claims. (Cl. 74—325)

This invention relates to reduction gear units and more particularly to a compact reduction gear box with simple novel provision for a multiplicity of reduction ratio changes between input and output, providing a highly satisfactory unit particularly adapted for use with meters such as taximeters, speedometers, odometers and other registering devices.

The use of a variable gear reduction unit with taximeter fare registration is particularly important. A taximeter is generally driven by means of a flexible cable, the input end of which, in most instances, is connected to the output of the vehicle transmission so the cable revolutions—and, therefore, the input to the meter—are directly proportional to the revolutions of the vehicle wheels. Many taximeters currently in use are calibrated so every 60 input revolutions will cause registration of the proper revenue for one mile of transportation.

Due to certain variable conditions, the number of revolutions of the speedometer cable may vary anywhere from 945 rev. per mile to 1050 rev. per mile (approximate values). Not only is it necessary, therefore, to utilize a gear reduction box between the cable and the taximeter but it is necessary that the reduction ratio be capable of adjustment to insure that the input to the meter be as near to 60 rev. per mile as possible, regardless of whether the speedometer cable is caused to turn 945 rev. per mile or 1050 rev. per mile or intermediate variations. Since the speedometer cable is connected to the transmission output and its revolutions are also directly proportional to the roadway distance travelled by the vehicle wheel during each revolution, the variable conditions affecting true registrations might therefore be any condition under which the wheel diameter is subject to change. For example, a gear reduction unit adjusted for proper registration at the time new tires are installed on the vehicle will, after the tires wear and reduce the wheel diameter, result in increased wheel and hence speedometer cable revolutions per mile, causing the taximeter meter to over-register. Between vehicles of the same and different makes, wheel diameters vary enough to introduce substantial errors in meter registration over a period of time. Although these wheel diameter variations are not enough to affect use of standard size tires, etc., they are sufficient to affect the readings of a meter changed from one vehicle to another whether the vehicle is the same or a different make.

In recent years various local authorities have been conducting strict periodic and spot inspections of taximeter registrations against distance traversed by the cab. Present day tolerances allowed on the output of the speed reduction unit are very small and inspections are becoming more frequent. Because of the high mileage covered by taxis with consequent wear of tires and replacement of transmissions and differentials and use of oversized tread snow tires, frequent changes in the speed of the cable result. This combination of frequent inspections and frequent changes in cable speeds necessitates use of a gear reduction unit which is readily adjusted to maintain the correct reduction unit output (the meter input) constant at 60 revolutions for every mile traversed by the vehicle.

The necessary requirements for an acceptable gear reduction unit are as follows:

(1) That the unit provide a means of reducing the relatively large number of speedometer cable revolutions per mile to the 60 revs./mile or some standard fixed value as required on the taximeter input.

(2) That it be possible to conveniently reduce any cable speed, in the range from 945 rev./mile to 1050 rev./mile, to the standard meter input of 60 or other revolutions per mile.

(3) That the unit be small and compact so it can be fitted in a limited mounting space.

(4) That a positive drive through the unit be provided since taximeters require high torque under certain conditions. Therefore, the amount of torque must be limited only by the strength of the gears.

Previous units have failed to meet either one or all of these requirements. United States Patent No. 2,644,346 shows one of these prior art units. This unit does not fully meet requirements 1 and 2 since only a limited number of ratios can be obtained with a single worm drive. In fact, only such cable speeds as 1020, 990 and 960 rev. per mile can be reduced to 60 exactly in this unit, by using 17, 16.5 and 16 to one ratio respectively. One taximeter Co. has used a variation of this design mounted within their taximeter. They obtain a much greater range of ratios by using a much larger worm wheel (about 100 teeth) and the wide range is obtained by the addition or subtraction of a few teeth. This increases the size of the unit and conflicts with requirement 3. Another company has a design consisting of two units. A worm unit reduces the cable speed by approximately 16:1 and a second spur gear unit reduces the speed still further. This combination has not met with wide consumer acceptance since every change in reduction ratio necessitates replacement of the second unit with a completely different spur gear unit.

This invention completely satisfies the requirements which have been set forth above for a reduction gear unit for taximeters. The unit is small and compact. It is designed to be mounted either on the taximeter or in line with the speedometer cable. It is easily disassembled. By a simple replacement of two small spur gears, the output speed can be controlled so the error in the taximeter registration is held to a minimum (±0.17%).

A major problem encountered in gear reduction units of this type, which are subject to frequent gear changes to meet varying input conditions, is the necessity of providing means (wholly within the unit) for changing the axes of rotation as the gear diameters change to enable proper meshed gear transmission of power. The present invention provides a quick and simple means of changing these axes without affecting the efficiency or accuracy of the drive.

Accordingly, a primary object of this invention resides in the provision of a novel reduction gear unit that can be quickly and simply changed from one change speed ratio to any one of a multiplicity of change speed ratios.

Another object resides in the provision of a novel compact reduction gear unit capable of a high reduction from input to output with a convenient simple structure for introducing a multiplicity of minute change speed corrections in the output.

A further object resides in providing a novel, small, compact reduction gear unit for use in the drive connection between a taximeter and a speedometer cable drive with provision for a high reduction from the cable drive to the taximeter drive and with structure for conveniently enabling a multiplicity of minute change speed corrections in the drive to the taximeter.

Still another object resides in providing a novel compact reduction gear unit with at least three gears in the output drive train and wherein one of said gears is an idler gear meshing with the other two, the axis of two of the gears including the idler gear are shiftable relative to each other and to the axis of the third gear and the two gears other than the idler gear are interchangeable and replaceable with gears having variations in number of teeth.

A still further object resides in providing a novel compact reduction gear unit including a worm and worm wheel reduction with the worm fixed against axial shift and the worm wheel mounted on a journal stud selectively adjustably, laterally shiftable in a path parallel to the worm axis, a spur gear coaxially and removably fixed rigid on the worm wheel, a second spur gear in stacked arrangement over the first spur gear and removably fixed to a rotatable member having a fixed axis, a single idler gear on an adjustable, laterally shiftable axis meshed with the stacked spur gears and an output member connected to be rotated by the rotatable member, with all of the aforementioned components encased in a covered housing.

Further novel features and objects of this invention will become apparent from the following detailed description and the appended claims taken in conjunction with the accompanying drawings showing preferred embodiments thereof, in which:

Figure 1 is a perspective view illustrating the gear reduction unit of this invention installed between two parts of a speedometer cable with the gear reduction output adapted to be connected to a taximeter input;

Figure 2 is an enlarged plan view of the reduction unit, omitting the cover but including all gears to show their relationship. To provide an approximate concept of true size, Figures 2–8 on the original drawing sheets are double the actual size of 1 x 1¾ x 2½ inches of the gear box currently produced for use with taximeters requiring a 60 r.p.m. input;

Figure 3 is a section view, taken on lines 3—3 of Figure 2, illustrating the stacked arrangement of the worm wheel and two spur gears;

Figure 4 is a section view, taken on line 4—4 of Figure 2, illustrating the stacked arrangement of the worm wheel and two spur gears and shows the idler gear meshed with both spur gears. This view clearly illustrates the eccentricity between the adjustable stud that journals the worm wheel and lower spur gear and the axis of the upper spur gear;

Figure 5 is a plan view, similar to Figure 2, with the idler gear and spur gears removed and illustrates the accessibility of the worm wheel and lower spur gear stud bracket mounting screws through the worm wheel;

Figure 6 is a section view taken on lines 6—6 of Figure 5, illustrating details of the worm wheel and its adjustable stud;

Figures 7 and 8 are detail plan and elevation views, respectively, of the adjustable stud;

Figure 9 is a bottom view of the cover with output member, also shown in section in Figure 4;

Figure 10 illustrates one of the replaceable spur gears;

Figure 11 is an elevation view of a modified cover with offset output components; and Figure 12 is a bottom view of the modified cover shown in Figure 11.

The compact nature and small size of gear reduction unit 20 is evidenced from the perspective view in Figure 1. A gasket and a ⅛ inch plate cover 21 are mounted on the top surface of a cast housing 22. A cable 23 from the vehicle transmission connects to one side of reduction unit 20 and a second cable 24 from the opposite side extends to the vehicle speedometer (not shown). Reduction unit 20 includes a large speed reduction between the transmission cable input and an output connection 25 passing through the cover 21 to a taximeter 26.

With particular reference to Figures 5, 6 and 7, the housing 22 is formed with a gear train cavity 30, an idler gear recess 32, and a transverse bore 34. Raised boss portions 36 are formed in the bottom of the gear train cavity 30 during casting. Bore 34 is threaded (Figure 5) and contains adaptors 42 journalling a worm gear 38 with integral end shafts 40 internally formed to enable drive connection with the transmission and speedometer cables 23 and 24 so the gear box 20 provides a take-off reduction drive from a through drive between the transmission and the vehicle speedometer. The two cable sections 23 and 24 connected by worm gear 38 may be considered as the complete speedometer cable. Cable connection adaptors 42, threaded in the ends of bore 34, axially position and journal the worm gear 38 by abutment against integral worm gear shaft flanges 44. Various holes are drilled in the housing 22 and some are tapped as follows. A tapped hole 46 extends up through the casing wall into idler gear recess 32 for mounting purposes. Other holes 47 and 48, through from the top face of the housing, receive bolts which together with a cap screw in a tapped hole 49 above the worm gear bore 34 rigidly secure the previously mentioned gasket and cover plate 21 on the housing 22 (Figure 1). The two holes 50 and 51 (Figure 4), shown in the bottom of cavity 30, are tapped to receive machine screws 52 which adjustably secure a gear adjuster 54 to the bottom wall of cavity 30, as will be described. A shallow idler arm recess 56 has been provided in housing 20 for a purpose which will become apparent.

Gear adjuster 54, details of which are shown in Figures 7 and 8, is made with a relatively thin bottom plate 58 and an integrally formed upwardly extending post 60, with an annular bearing shoulder 62 surrounding the base of post 60. Open end slots 64 are formed in each end of plate 58 and enable the gear adjuster 54 to be mounted against the bottom wall of gear cavity 30 with the raised bosses 36 received in the plate slots 64. Bosses 36 are positioned to, when screws 52 are loosened, guide lateral shifting of the gear adjuster 34 in a confined movement parallel to the axis of worm gear 38. The height of raised bosses 36 above the bottom surface of gear cavity 30 is less than the thickness of gear adjuster bottom plate 58 so gear adjuster 54 is securely clamped between screws 52 and the bottom of gear cavity 30 when screws 52 are tightened. This prevents any movement of the gear adjuster after an adjusted position is determined in a manner as will be hereinafter explained in detail. A circular recess 65 is provided in the bottom of gear cavity 30 between bosses 36 so the area of contact between the adjuster plate 58 and the bottom wall is only at its ends adjacent the bosses 36. This reduces the possibility of imperfections in a cast housing causing the post 60 to cock out of vertical alignment.

A worm wheel 66 is rotatably mounted on post 60 and, regardless of the lateral position of gear adjuster 54 on bosses 36, will mesh with and be driven by worm 38. The hub 68 of worm wheel 66 is placed on post 60, bears against and is supported by the annular bearing surface 62 on gear adjuster 54 so the worm wheel 66 may rotate without interference with the heads of screws 62. For specific use with certain types of taximeters a speed reduction ratio of 15.5:1.0 exists between the worm 38 and worm wheel 66.

Clearly illustrated in Figures 4, 5 and 6, worm wheel 66 has two locating and gear drive pins 70 pressed into its web and projecting from its upper face. The end of post 60 also projects above the upper face of worm wheel 66 a distance approximately equal to that of the projecting pins 70. Two diametral holes 71 through the web of worm wheel 66 provide access to the adjuster clamping screws 52, so a screw driver tool can be inserted to loosen or tighten the screws for shifting the adjuster 54 without removing the worm wheel 66. Figure 5 illustrates the holes 71 positioned above the screws 52, one of which has been removed to illustrate details. A spur gear 72, centrally apertured at 74 to be rotatably disposed on post 60, has two diametrally spaced holes 76 adapted to receive pins 70 so spur gear 72 will be rotated with and driven by the worm wheel 66. Spur gear 72 is slightly thicker in dimension than the distance which post 60 projects above the worm wheel 66. Thus when spur gear 72 is mounted on the worm wheel 66 its upper surface is flat and unobstructed.

When cover 21 is fastened to housing 22, a centrally disposed bushing 78 journals a drive coupling member 80 on a fixed axis substantially centrally located relative to the gear cavity 30. The inner end of drive coupling 80 has an annular flange 82 and a short inwardly projected stub 84 which is the same daimeter as the gear adjuster post 60. Two locating and drive pins 85 are pressed in diametral holes 86 in the flange 82 and project downwardly a distance substantially equal to stub shaft 84. The drive and locating pins 85 are identical to the drive and locating pins 70 pressed into worm wheel 66 and their location relative to the axis of coupling member 80 is identical to the location of pins 70 relative to the axis of gear adjuster post 60. A centrally apertured spur gear 72' with two diametrically spaced holes 76' is coaxially fitted on the stub shaft 84 of coupling member 80 with holes 76' receiving the drive and locating pins 85. Thus, in assembly, as seen in Figures 3 and 4, the upper gear 72' and drive coupling 80 are stacked and rest on top of the lower spur gear 72 with the axis of coupling member 80 and hence gear 72' fixed in cover 21. Depending upon the adjusted position of gear adjuster 54, the gear adjuster post 60 will either be coaxial or eccentrically offset to one or the other side of the axis of coupling member 80. This adjustment permits the stacked gears 72 and 72' to be relatively positioned so their peripheries intersect a common line normal to the path of gear adjuster 54 and parallel to the axes of gears 72 and 72'.

With reference to Figures 2, 3 and 4, an adjustable idler gear 88 is meshed with the two spur gears 72 and 72'. Idler gear 88 is rotatably journalled on a post 90 rigidly fixed in and projecting below one end of an idler gear arm 92 which has its other end secured in the idler arm recess 56 by means of a cap screw 94. By loosening the cap screw 94 slightly, the arm 92 is released for limited pivotal movement about the axis of cap screw 94, this movement of the idler gear 88 being permitted by the lateral extent of idler recess 32. The bottom of idler gear recess 32 is on a level substantially coplanar with the upper surface of worm wheel 66. Thus as the arm 92 is pivotally moved so idler gear 88 moves out of its recess 32 over the worm wheel 66, the idler gear 88 is prevented from dropping off of post 90 by coaction with the upper surface of worm wheel 66. The width of the teeth of idler gear 88 is sufficient to span the combined widths of the teeth on gears 72 and 72'. In the operative unit, arm 92 is swung about its pivot point until the teeth of gear 88 mesh with the teeth of gears 72 and 72', the arm then being locked in position by tightening down on cap screw 94. The locked position of idler gear 88 will be determined by the size of gear 72'. A vertical plane through the axes of idler gear 88 and gear 72' will be substantially coextensive with the path of movement of the axis of post 60. The manner of making a correct adjustment of the gear adjuster 54 and the idler gear arm 92 will be more fully explained hereinafter when details of minute variations of speed reduction are described.

There are some installations of taximeters in which the input drive must be operated in a reverse direction from that normally obtained through the vehicle transmission. In order to adapt this invention to either a clockwise or counterclockwise taximeter input reversal of output can be obtained by simply bringing the gear box input drive in on the opposite side of worm 40.

MODIFIED OUTPUT AND COVER

The modified cover 100 illustrated in Figures 11 and 12, is used in lieu of cover 21 illustrated in Figures 4 and 9, and includes a modified output mechanism, offset from the position of coupling shaft 80 in Figure 4. In some installations when the gear box is mounted directly behind the speedometer, it is necessary to shift the position of the taximeter output to a location adjacent the side of the cover.

Instead of the output coupling bushing 78 being centrally disposed in cover plate 100, a stub post 102 is centrally fixed in plate 100 and projects downwardly therefrom. Journalled on post 102 is a gear 104 including two spur gear locating and drive pins 108 pressed in diametrical holes and an integral coaxial sleeve extension 106. Short sleeve 106 has the same external diameter as the short sleeve 84 on coupling member 80 in the first embodiment and pins 108 are located in an identical fashion to the drive and locating pins 85 on coupling member 80. Thus a spur gear such as 72' shown in Figure 4 can be placed on the short sleeve 106 in engagement with the drive pins 108 of Figure 11 and when cover 100 is placed and fastened on the housing 22 the spur gear 72' will occupy the same position as shown in Figures 4 and 3.

Offset to one side of the centrally located stub post 102, a bushing 110 is fixed in cover plate 100. Extending through the bushing 110 from inside cover 100 is a coupling shank 112 of an output gear 114 the same size and having the same number of teeth as, and meshed with gear 104. When cover 100 is assembled, a portion of gear 114 as disposed immediately above one side of the idler arm recess 56 as indicated by the letter X in Figure 5. Cooperation between the gear 114 and idler arm recess portion X prevents displacement of gear 114 from the cover 100 when assembled. Note that rotation of coupling shank 112 will be in the opposite direction from rotation of the coupling member 80 in Figure 4, but proper direction of rotation can be obtained by changing the input coupling as hereinbefore described.

OPERATION AND ADJUSTMENT

In operation, the train of drive from the gear box input to the output is as follows: cable 23, from the vehicle transmission, drives worm 38 which drives the speedometer cable 24 at a direct speed and also drives the worm wheel 66 with a speed reduction of 15.5:1.0. Since gear 72 rotates with the worm wheel 66 and meshes with idler gear 88, the idler gear 88 is driven by gear 72 and in turn drives the upper spur gear 72' which is drivingly connected to the coupling member 80. Coupling member 80 is connected by suitable means 25 to the input of taximeter 26. The speed reduction ratio of the gear box may be varied within suitable limits to maintain the taximeter input (gear box output) substantially at 60 revolutions per mile for variations per mile in the gear box input by proper choice of gears 72 and 72'. In this connection note that the axis of rotation of the output drive coupling 80, and, therefore, the position of the axis of gear 72', is constant and cannot be changed.

Assuming that it is desired to check the meter registration, the vehicle is taken to an accurately laid out one-mile course where a counter registers the revolutions per mile of the speedometer cable. If, for example, the counter registers 945 rev./mile, by choosing gears 72 and 72' to have 62 and 63 teeth respectively, it is found that this combination will give a meter input almost exactly 60 rev. for each mile traversed by the vehicle. By using this combination of gearing, when conditions are such at the wheel that one mile in vehicle transportation results in 945 cable revolutions, it will be found that for each mile traversed, the input to the meter will be exactly 60 revolutions which, of course, causes the meter to register the precisely correct revenue for one mile of transportation.

Thus:

$$945 \times \frac{1}{15.5} \times \frac{62}{63} = 60.00$$

After the vehicle has been driven for some period of time and is again tested it may be found that, due to tire wear and other factors, the speedometer cable now makes 970 revolutions for each mile traversed by the cab. However, the meter will still register fare for one mile of transportation after the cable has turned only 945 revolutions. Translated into distance, this means that the passenger will be charged for a mile of transportation after only being transported $$5280 \times \frac{945}{970} = 5140 \text{ ft.}$$

or 140 ft. less than one mile (5280 ft.—1 mile). This discrepancy will not result in great error for any one trip but it is cumulative and in the course of days, weeks and months, will continue to mount and result in a substantial overcharging of the public.

However, with a reduction unit input of 970 revolutions per mile, if gears 72 and 72' are now selected having 46 and 48 teeth respectively, the meter input for each mile will become $$970 \times \frac{1}{15.5} \times \frac{46}{48} = 59.97$$

Since 60 input revolutions to the meter causes it to register one mile of fare, using gears with 46 and 48 teeth respectively as gears 72 and 72', the speedometer cable will now turn $$60 \times \frac{48}{46} \times 15.5 = 970.46$$

for each mile of fare registered on the meter. Since the cable turns 970 revolutions for each mile traversed, each revolution of the cable represents 5.44 feet of travel of the vehicle and since the meter now requires 970.46 cable revolutions to record fare for one mile, the vehicle will travel 5.44×.46=2.5 feet more than one mile to cause the meter to register fare for one mile. This error is, of course, completely negligible.

The following chart, identified as Chart I, gives the proper combination of gears 72 and 72' for several conditions of speedometer revolutions per mile traversed. Values are listed near the normal lower and upper limits of speedometer cable revolutions per mile and also for the 970 meter input used as an example above. The gear values and tolerances for each different input rotation between and beyond the normal limits are not listed but can be readily calculated. As shown by the tolerances in the right hand column of Chart I the error in meter registration may be held to within acceptable limits. In the case just cited, when it is found that the speedometer cable turns 970 revolutions per mile of vehicle travel, use of a gear having 48 teeth for gear 72' and of a gear having 46 teeth for gear 72 will result in travel of the vehicle of 5282.3 feet for one mile of fare registered on the meter. The difference in 2.3 feet from the chart and 2.5 feet calculated above results merely from difference in the number of significant figures to which the calculations were carried out in the two cases.

Chart I.

| Speedometer Cable, Revolutions Per Mile | Teeth on Driven Gear (72') | Teeth on Driver Gear (72) | Tolerance, Ft./Mile | |
|---|---|---|---|---|
| | | | Under | Over |
| 945 | 63 | 62 | | 0.0 |
| | 64 | 63 | 1.3 | |
| 946 | 59 | 58 | | 0.8 |
| | 60 | 59 | 1.3 | |
| 947 | 55 | 54 | | 1.5 |
| | 56 | 55 | 0.5 | |
| 948 | 52 | 51 | | 1.3 |
| | 53 | 52 | 6.7 | |
| 949 | 49 | 48 | | 3.2 |
| | 50 | 49 | 0.0 | |
| 970 (Example) | 48 | 46 | | 2.3 |
| | 49 | 47 | 2.2 | |
| 1,046 | 45 | 40 | | 1.3 |
| | 64 | 57 | 4.0 | |
| 1,047 | 62 | 55 | | 6.8 |
| | 45 | 40 | 3.7 | |
| 1,048 | 53 | 47 | | 3.6 |
| | 45 | 40 | 8.8 | |
| 1,049 | 44 | 39 | | 1.2 |
| | 53 | 37 | 1.3 | |
| 1,050 | 52 | 46 | | 6.6 |
| | 44 | 39 | 3.8 | |

Thus, once the exact number of speedometer cable revolutions are determined, the proper combination of gears can readily be found to give the minimum error in registration, together with the slight amount of vehicle overtravel or undertravel resulting from the use of that particular combination of gears.

In changing the speed ratio obtained from gears 72 and 72', the diameter of one or the other or both gears 72 and 72' will change, which of course necessitates an adjustment in the position of the axis of at least one of the gears 72 or 88. Since the axis of gear 72' is fixed, means are provided to adjust the position of the axis of rotation of both gears 72 and 88. The gear box is assembled to assure proper meshing of all gears in the following manner.

Screws 52 are loosened slightly, not removed, to permit limited movement of gear adjustor 54 along a path parallel to the axis of worm 38. A selected gear 72 is placed on worm wheel pins 70 and the worm wheel and spur gear sub-assembly is rotatably mounted on post 60 of the gear adjustor 54. A selected gear 72' is placed on the pins of drive coupling 80 and the assembled coupling and spur gear 72' then laid on top of gear 72 in a position which would bring the shaft of drive coupling 80 into approximate alignment with the bushing 78 in cover 21, in which the drive coupling shaft is received for rotation when cover 21 is secured in position on housing 22. Idler arm 92 is swung so the idler gear 88 will be placed into mesh with gear 72'. At this point in assembly, cap screw 94 should be tightened slightly to substantially prelocate the gear 88 in its position so it will not be easily moved therefrom except by the exertion of some positive force. Gear adjustor 54 is then moved in a path parallel to the axis of worm 38 to bring the teeth of spur gear 72 into mesh with gear 88. The cover 21 is placed on the gear box so the shaft of drive coupling 80 is received in the bushing 78 provided in the cover. Because the original placing of gear 72 was only approximate, the cover 21 may not be in exactly the correct position to allow its being secured to the housing. If necessary, the cover is forcefully moved to its proper position for being secured and in so doing, the gear 88 may be moved slightly by the accurate locating movement of gear 72' which must assume its correct position with correct alignment of cover 21. The gear 72' and gear 88 are now in proper position with respect to each other and with respect to the cover to obtain proper meshing when the cover 21 is secured to the housing 22. The cover is then removed and idler arm cap screw 94 completely tightened to positively secure idler arm 92 with its gear 88. The assembled coupling and gear 72' is now removed and the gear adjustor 54 shifted, if necessary, to again bring the teeth of spur gear 72 into mesh with idler gear 88. Without disturbing the position of adjustor 54, gear 72 is removed from the worm wheel 66 and a screw driver or suitable tool is inserted through worm wheel access holes 71 to tightly secure screws 52. This will fix the position of gear adjustor 54, worm wheel 66 and gear 72 in their adjusted position. When gear 72 is remounted on pins 70 of worm wheel 66, it will mesh with the secured idler gear 88. The assembled gear 72' and the drive coupling can then be mounted on the cover 21 and the cover fastened on the housing 22 which places the teeth of gear 72' in proper mesh with the teeth of gear 88, inasmuch as they have been previously so adjusted.

As can be seen, the above described invention provides a compact transmission unit including a means for adjusting the axis of rotation of at least one gear of a contained gear train, without changing the position of the axis of the input and output shafts of the transmission unit. This arrangement enables a convenient accommodation of gears having different diameters to meet varying input conditions and permits the selection of any of a multiplicity of different ratios in the gear train.

The foregoing described gear reduction box is particularly useful with a meter that registers one mile of fare for every sixty revolutions of input. This gear reduction box unit although described for use with meters for a sixty revolution per mile input can be very readily adapted for use with meters registering one mile for a different number of input revolutions—say 40—by simply providing a worm gear 19 which would give a different speed reduction than the one provided. Thus, this unit provides a means of rendering a taximeter extremely accurate for all varying conditions of vehicle wheel diameters and can be readily adapted for use with meters requiring a different number of input revolutions to register the proper fare for one mile of transportation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A reduction gear unit comprising: a housing; an input drive; an output drive; said input and output drives being rotatably disposed in said housing with their axes fixed; at least two gears providing a gear train between said input and output drives; and adjustable shifting means independently rotatably mounting each of said two gears on independent, parallel and spaced apart axes which can be independently shifted to change the linear space relationship between said axes of said two gears and the fixed axes of said input and output drives.

2. A reduction gear unit as defined in claim 1 together with a plurality of interchangeable gears having varied numbers of teeth for substitution in place of a minimum of either one and a maximum of both of said two gears in said gear train, whereby a multiplicity of minute changes in speed ratios can be introduced between the input and output drives.

3. A gear reduction unit for use in the drive connection between taximeter and a speedometer cable drive combination, comprising: a housing; a high reduction drive contained in said housing and including a through drive input means adapted to connect between a speedometer cable and a taximeter with a gear train means drive connected to said input means in said housing including a set of replaceable gears enabling a multiplicity of minute changes in speed ratios in the output drive to the taximeter.

4. A compact reduction gear unit comprising: a housing, an input drive, an output drive, a gear train between said input and output drives in said housing including at least three gears, wherein one of said gears is an idler gear meshing with the other two gears, means mounting two of said gears so that the axes of said two of the gears is adjustably shiftable to change the linear spacing of said axes relative to each other and to the axis of the third gear and two of said gears being interchangeable and replaceable with gears having variations in number of teeth.

5. A compact gear reduction unit comprising: a housing having an input drive and an output drive; said input drive including a worm gear and a worm wheel meshed with said worm gear to provide a high reduction; means fixing said worm gear against axial shifting in said housing; a journal stud for rotatably mounting said worm wheel in said housing, selectively, adjustably, laterally shiftable in a path parallel to the axis of said worm gear; a first spur gear in said housing coaxially and removably drive coupled to said worm wheel; a fixed axis rotatable member in said housing; a second spur gear in said housing in stacked arrangement over said first spur gear and removably drive coupled to said rotatable member; a single idler gear; means mounting said idler gear on an adjustable, laterally shiftable axis so as to be meshed with the two stacked spur gears; and said rotatable member being drive connected to said output drive.

6. A compact gear reduction unit comprising: a housing, an input drive, an output drive, a gear train enclosed within said housing comprising a high speed reduction branch connected to said input drive and a low speed reduction branch connected between said high speed reduction branch and said output drive, the axes of one of said high speed reduction branch gears and one of said low speed reduction branch gears being fixed relative to said housing and the axes of another of said high speed reduction branch gears and another of said low speed reduction branch gears being sihftable relative to said housing and the first mentioned gears in their respective branches, said shiftable axis low speed reduction branch gear being removable and replaceable by similar gears having variations in numbers of teeth.

7. A compact gear reduction unit comprising: a housing; a straight line through drive having an input and an output; a second output; a gear train enclosed within said housing, one of said gears of said gear train being integral with said through drive and, together with a second of said gear train gears comprising a high speed reduction take-off from said through drive; and the remainder said gears of said gear train comprising a low speed reduction drive connected between said high speed reduction take-off and said second output and having two gears removable and replaceable by other gears having variations in numbers of teeth.

8. A compact gear reduction unit as defined in claim 7, wherein said one of said gears of said gear train is a worm, said second of said gears of said gear train is a worm wheel and one of said removable gears of said gear train is removably mounted coaxial with said worm wheel.

9. A compact gear reduction unit as defined in claim 8 wherein an adjustably shiftable stub post is provided on said housing and said worm wheel with its removably mounted coaxial gear is rotatable disposed on said stub post which is shiftable in a path normal to its axis and parallel with the axis of said through drive.

10. A reduction gear unit comprising: input and output members; a reduction gear train drive coupled between said input and output including means permitting a plurality of minute gear reduction changes; said means having two removable gears, a mounting means for each of said two gears, an idler gear assembly providing a drive between said two gears, a third mounting means for said idler gear assembly; and at least two of said mounting means being shiftable to permit removal and replacement of a minimum of either one and a maximum of both of said two gears with other gears having varied numbers of teeth so that a speed ratio change may be obtained between input and output members.

11. A gear reduction unit for use in the drive connection between a taximeter and a vehicle speedometer cable drive connection comprising: a housing containing a high speed reduction mechanism drive coupled between said speedometer cable and said taximeter; a gear train means in said reduction mechanism including a set of two replaceable gears for enabling a multiplicity of minute changes in speed ratios in the mechanism output to the taximeter; said high speed reduction mechanism including a worm meshed with a worm wheel; a through bore in said housing receiving said worm; bushings removably fixed in the ends of said bore for rotatably mounting said worm; means on one end of said worm providing an input coupling from a vehicle drive; means on the other end of said worm providing an output coupling for said speedometer cable; and means drive connected to one of said two replaceable gears providing an output coupling for the taximeter.

12. A reduction gear unit comprising: a housing having an input drive and an output drive; a set of gear wheels stacked one on top of the other within said housing; an idler gear wheel meshed with two of said stacked gear wheels within said housing; a worm gear within said housing meshed with a third one of said stacked gear wheels; a fixed axis support rotatably mounting one of said gear wheels which is drive coupled to said output drive; an adjustable laterally shiftable journal post in said housing with two of said stacked gear wheels being rotatably disposed on said journal post; a second shiftable journal post in said housing rotatably mounting another of said gear wheels; the two of said gear wheels meshed with said idler gear being removable and replaceable with other gears having variations in numbers of teeth.

13. A reduction gear unit comprising: a housing; an input drive; an output drive; said input and output drives being rotatably disposed in said housing with their axes fixed; at least three gears in said housing; means removably drive coupling a first one of said gears to said input drive; means removably drive coupling a second one of said gears to said output drive; a third one of said gears being meshed with said first and second gears; and means rotatably mounting said gears in said housing permitting a relative lateral shift of at least two pairs of axes of said three gears, one pair of axes being the axes of said first and second gears, each time any one of said gears is replaced by a different sized gear to permit meshing of said third gear with said first and second gear.

14. A reduction gear unit comprising: a housing having a removable cover; an input drive; an output drive; said input drive being rotatably disposed in said housing and said output drive being rotatably journalled in said cover, the axes of both said input and output drives being relatively fixed in said housing; and a gear train in said housing between said input and output drives including at least two gears, each of which has its axis adjustably shiftably secured in said housing and a third gear journalled on a fixed axis on said housing cover and removably coupled to said output drive.

15. A reduction gear unit comprising: a housing; an input drive; an output drive; said input and output drives being rotatably disposed in said housing with their axes fixed; and a gear train in said housing between said input and output drives including at least two gears, mounting means for each of said two gears enabling the axis of each of said two gears to be independently, adjustably shiftably secured in said housing, at least one of said mounting means providing a straight line shift path of the axis of the associated gear which varies the linear distances between such axis and both of the axes of the input drive and the output drive, and a third gear journalled on a fixed axis relative to said housing and removably coupled to said output drive.

16. A reduction gear unit comprising: a housing; an input drive; an output drive; said input and output drives being rotatably disposed in said housing with their axes fixed; and a gear train in said housing between said input and output drives including at least two gears, each of which has its axis independently, adjustably, shiftably secured in said housing, and a third gear journalled on a fixed axis relative to said housing and removable coupled to said output drive, one of said two gears and said third gear being stacked one on the other and the other of said two gears being meshed with both of said stacked gears.

References Cited in the file of this patent

UNITED STATES PATENTS

| | | |
|---|---|---|
| 1,919,512 | Helgeby et al. | July 25, 1933 |
| 2,094,669 | Pratt | Oct. 5, 1937 |
| 2,237,466 | Zimmerman | Apr. 8, 1941 |
| 2,506,562 | Wait | May 2, 1950 |